Patented Nov. 22, 1938

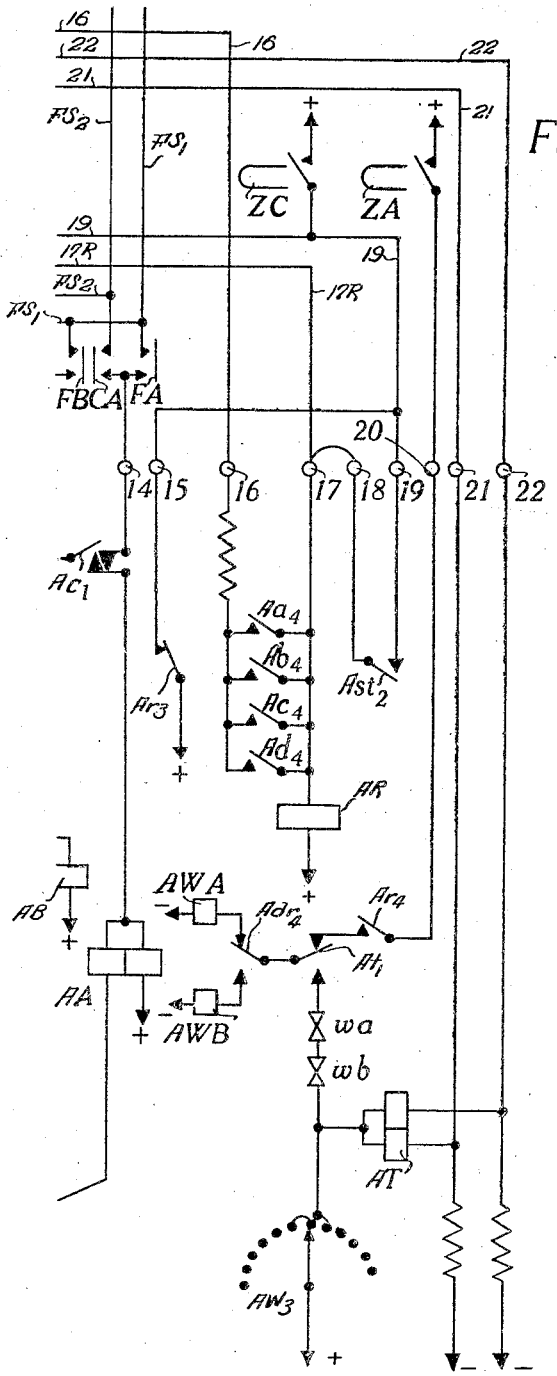
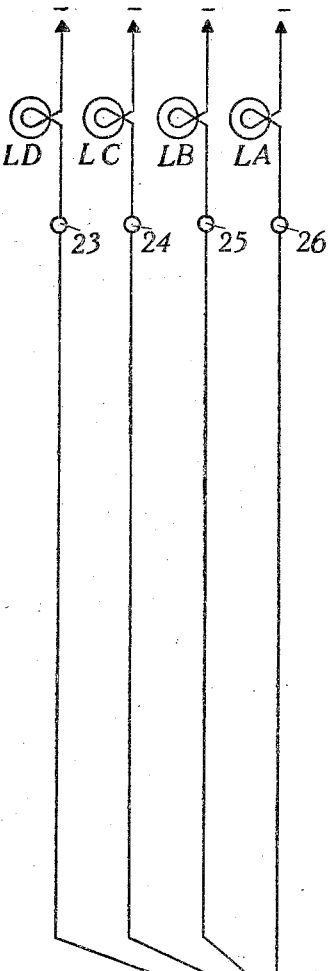
Fig. 1A

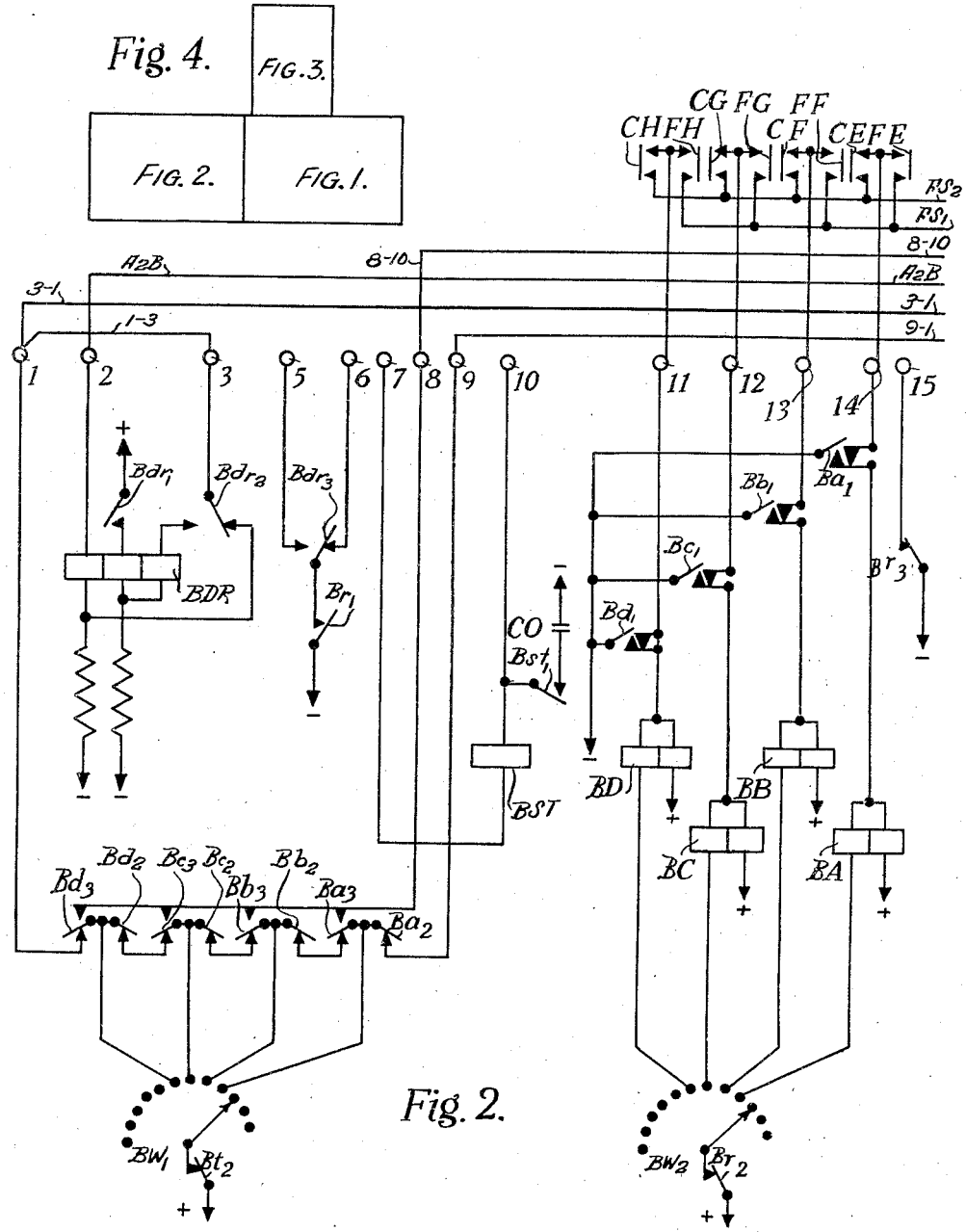

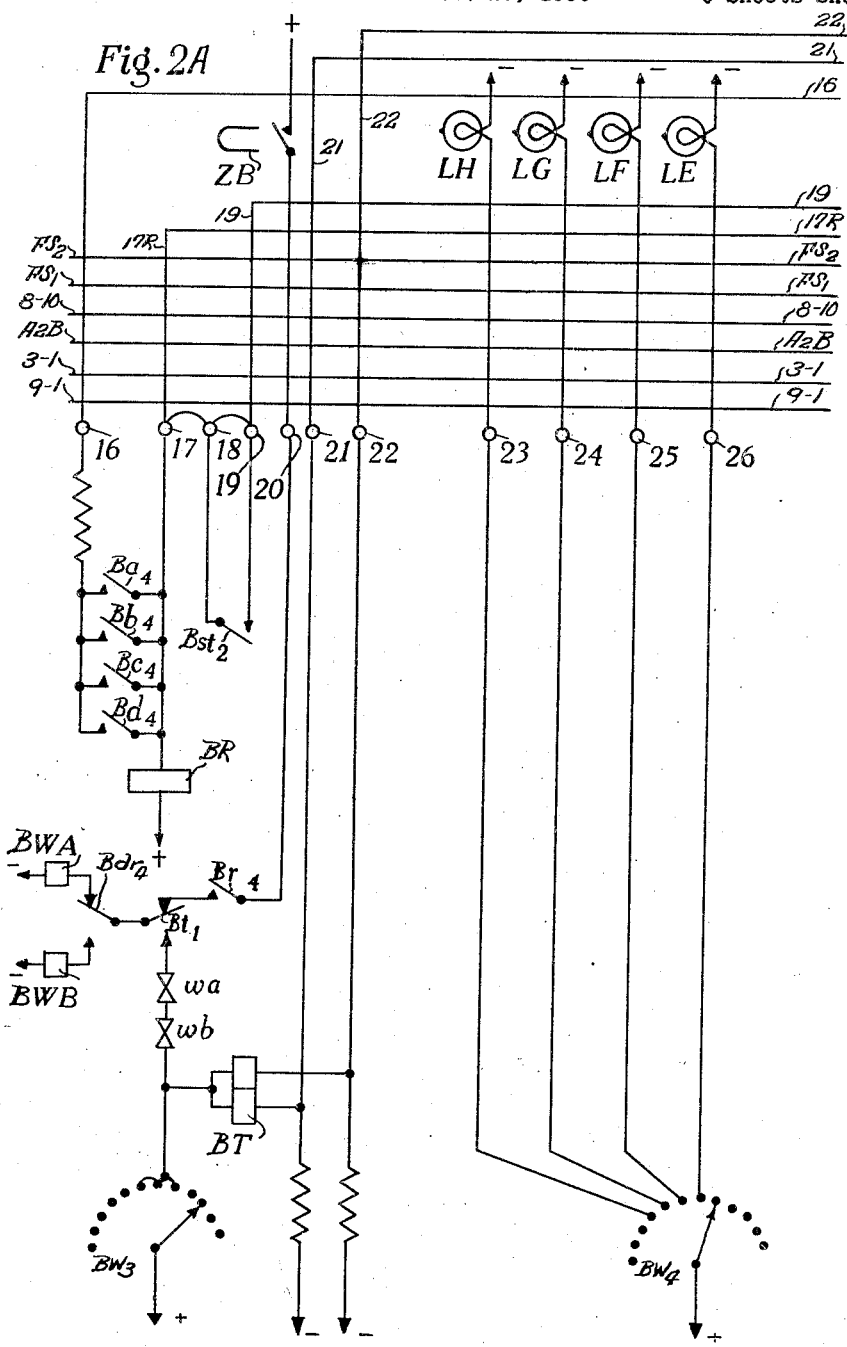

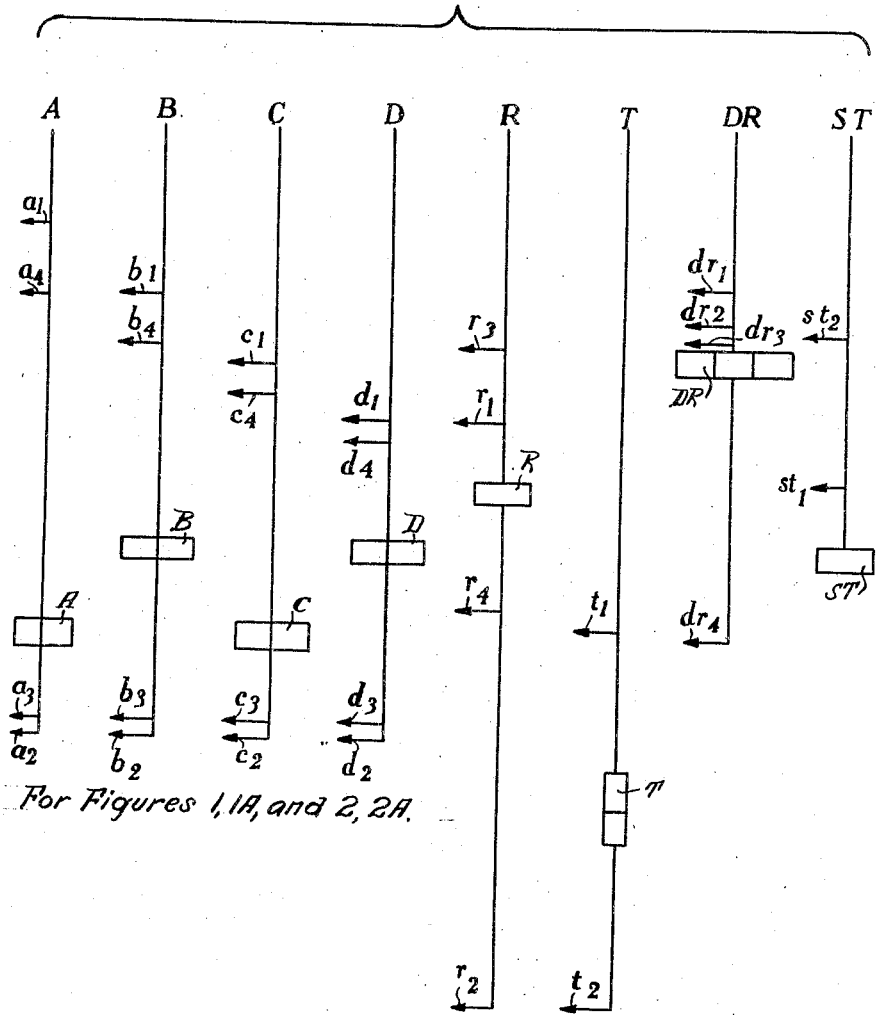

2,137,925

UNITED STATES PATENT OFFICE 2,137,925

ELECTRIC SYSTEM OF CONTROL FOR LIFTS

Norman Carol Smart, Coventry, England, assignor to The General Electric Company Limited, London, England Application November 20, 1936, Serial No. 111,779
In Great Britain November 7, 1935

9 Claims. (Cl. 187—29)

The invention relates to electric systems of control for lifts and has for its object the provision of improved facilities for lifts employing standardized control apparatus.

In the specification of Patent No. 2,094,047 is disclosed the elements of a group of apparatus for a lift, the said group being adapted to control all the normal actions of a lift i. e. starting, stopping, direction, call storage and cancelling and the like. The apparatus group referred to is adapted to cater for a particular maximum of floors, this maximum being determined principally by the dimensions of a step-by-step switch and relay group embodied therein. A further limitation is that the control group is intended to be a standard item available for use on all kinds of electrically controlled lifts. Buildings possessing a large number of floors are not common, and normally such systems require provision for stopping a lift at one of a few floors only, so that it would be uneconomical to construct a standard control unit so as to cater for the maximum possible number of floors to be found in a single building.

According therefore to the present invention, a control group of apparatus for an electrically operated lift comprises means for controlling the operation of the said lift over a number of floors up to a predetermined economical maximum, means also being provided whereby if a greater number of floors than the said maximum is to be catered for by the said lift, a further control group or groups similar to the first may be so interconnected with it as to enable such further control to be effective.

Figure 1:
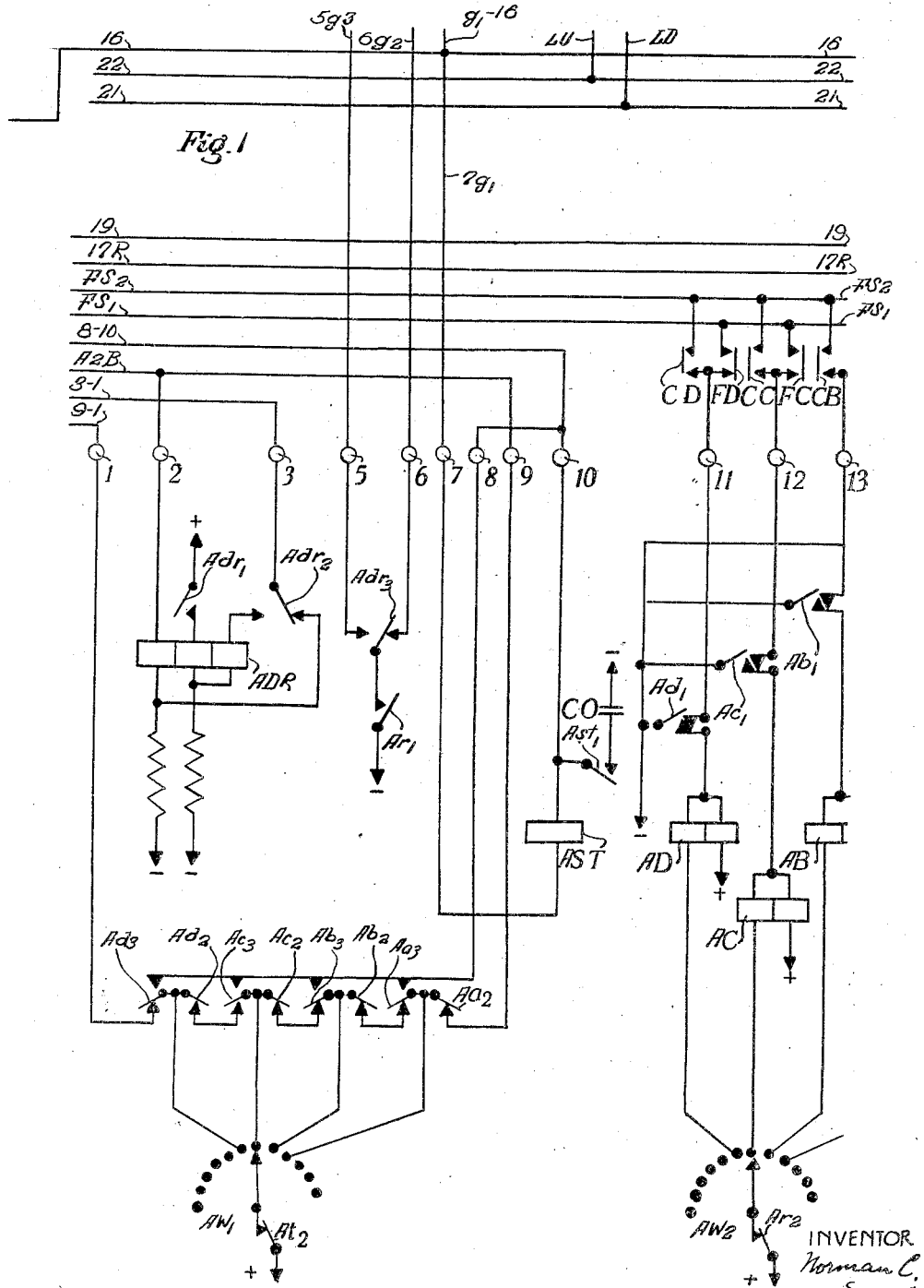
Figure 3:
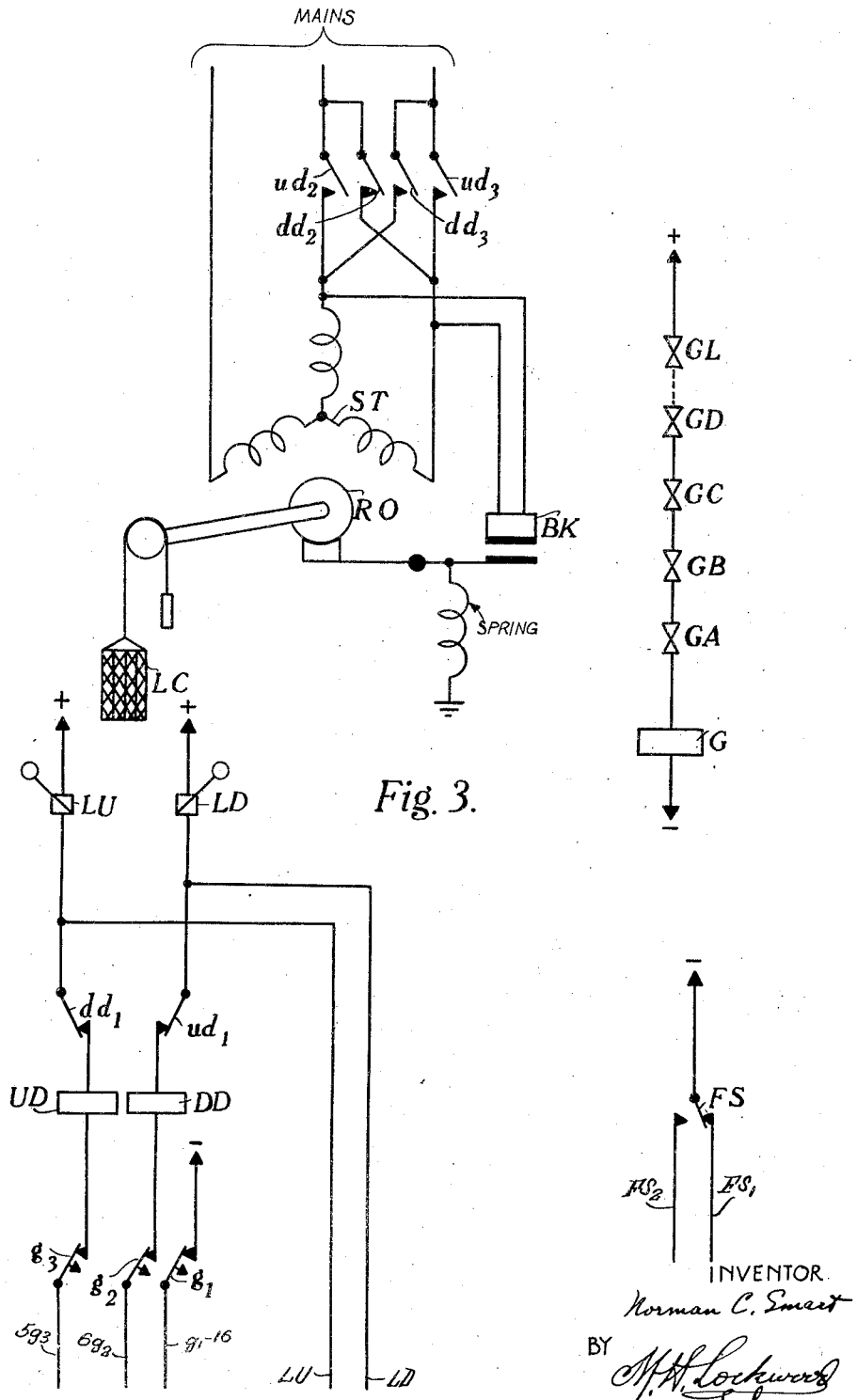

In order that the nature of the present invention may now be more particularly described and ascertained, reference should be made to the accompanying diagrammatic drawings, Figures 1 and 1A of which show the circuit of a standard apparatus controlling group, Figures 2 and 2A show the terminal connections for a second control group similar to the first, and Figure 3 is the lift driving apparatus and contactors. The groups, Figures 1 and 1A, 2 and 2A and 3 should be positioned as shown in Figure 4, while Figure 5 is a code sheet for the better understanding of Figures 1, 1A and 2, 2A.

The apparatus group shown in Figures 1, 1A is adapted to cater for four floors, although this maximum is not necessarily the best or most economical possible. This number is adopted as being a convenient one for the purpose of explanation, though the apparatus and switches may cater for as many as 11 or 12 floors per control group. The details of the apparatus shown in Figures 1, 1A are in most respects identical with those disclosed in the specification of Patent No. 2,094,047, the only difference being those which have been effected in order to simplify the description of the operation.

The system shown is adapted to cater for a building of 8 floors. Calls are stored from any one of the first four floors served by the lift by means of the push buttons FA—FD situated at the various floors, or by the buttons CA—CD situated in the lift car. Storage takes place by operation of one of the relays AA to AD, and the lift moves off in a direction to answer that call if not already engaged.

Similar call buttons FE—FH and CE—CH are provided for the fifth to eighth floors, these push buttons being connected to call storage relays in the second control group, Figures 2, 2A. This group is identical with that shown in Figures 1, 1A with the exception of one small connection on a switch bank which will be referred to later.

It is now proposed to illustrate the operation of the control groups according to the present invention by describing a typical lift traverse. As shown, the lift is stationary at floor 3 (the bottom floor being designated floor 1), with no stored calls. The step-by-step switch shown in Figures 1, 1A, having up and down drive magnets AWA and AWB and banks $AW_1$ to $AW_4$, is standing therefore on its third contact from the end corresponding to the lowest position of the lift. The switch BW in Figure 2 has its wipers standing on contacts which are one lower than the lowest floor (5th) served by the apparatus associated with it. None of its wipers therefore takes any part in the controlling of the lift until the latter is approaching or passes the fifth floor.

Assuming now that a call is made by the depression of the push button FG, signifying that a passenger requires the lift car at floor 7, this push button completes a circuit from switch FS in Figure 3 through lead $FS_1$ and the depressed button and terminal 12 to operate the BC relay in Figure 2. The switch FS is operated by the weight of a passenger on the floor of the lift car, and since no passengers are in the car it is standing in such a position (to right as shown) as to enable floor calls to be immediately effective. The operation of relay BC (Figure 2) produces the following reactions:—

$Bc_1$ locks relay BC operated.

$Bc_2$ and $Bc_3$ break a circuit from positive on contact $At_2$ Figure 1 via wiper $AW_1$, $Ac_3$, $Ad_2$, $Ad_3$, terminal 1 (in Figure 1) lead 9—1 to terminal 9, (Figure 2) $Ba_2$, $Ba_3$, $Bb_3$ and the like (all in Figure 2), this break removing the positive potential previously applied to terminal 1, Figure 2 and thence to one coil of relays ADR and BDR via. terminals 3 (Figures 1 and 2).

$Bc_4$ applies negative potential from contact $g_1$ (Figure 3) via $g_1$—16 to terminal 16 and the said contact $Bc_4$ to relay BR, which operates.

The relays ADR, BDR are those which are always operated to or remain in a position corresponding to the lift's direction of travel. They are connected in parallel by leads $A_2B$ and 3—1, and therefore operate together, as do the relays AR and BR through lead 17R. Removal of the potential as described above from one of its coils (left coil) enables the positive potential supplied through contacts $Ac_2$, $Ab_3$, $Aa_3$ and $Aa_2$ (all in Figure 1) thence via terminals 9, lead $A_2B$ and terminals 2 to cause relays ADR and BDR to move its contacts and take up a position corresponding to an up direction of drive.

$Ar_1$ applies negative via $Adr_1$ (left position Fig. 1) and terminal 5 and lead $5g_3$ to the up drive contactor UD, operating it.

$Br_2$ prevents call cancellation whilst the lift is moving.

$Ar_3$ prepares circuit for deenergizing relays AR and BR.

$Ar_4$ and $Br_4$ prepare stepping circuits for the switch magnet AWA or BWB.

The up drive contactor UD now closes its contacts $ud_2$ and $ud_3$, energizing the stator ST of the lift driving motor in a direction to cause the lift to move upward to answer a floor call. The brake BK is also energized and removes its shoe from the rotor shaft RO enabling the lift carriage LC to move in the shaft.

Contact $ud_1$ prevents false operation of the complementary contactor DD.

When the lift reaches a position midway between the third and fourth floors (lift started up from third floor) an inductor relay ZA closes its contact momentarily on passing an inductor plate situated in the shaft. This applies positive via terminal 20, contacts $Ar_4$, $At_1$ and $Adr_4$ (lower position) to magnet AWB, this stepping the switch AW one contact space in an upward direction. The wiper $AW_4$ and later $BW_4$ meanwhile lights lamps LA—LH situated at the floors, and numbered according to the numbers of the said floors, the lamp lit at any instant indicating the position of the lift. The lift continues to travel, and when it passes a point midway between the fourth and fifth floors, relay ZA (Figure 1A) operates once more, as also does a further inductor relay ZB, (Figure 2A). Relay ZA steps the switch AW so that its wipers leave all the contacts in its banks to which connections are made and is thereafter stepped no further no matter how far the lift has to travel, until the said lift reverses its direction and once more passes into the zone catered for by the switch shown in Figures 1, 1A.

Meantime, the momentary closure of the contact of relay ZB steps the switch BW in Figures 2, 2A in a direction corresponding to upward motion of the lift, in a manner similar to that described for the switch AW in Figures 1, 1A.

The only immediate action resulting from such stepping is the lighting of the lamps LE, LF and LG in succession as the lift moves nearer to the 7th floor, the said switch in Figures 2, 2A being stepped by the relay ZB at suitable points.

When the lift reaches a point half-a-floor ahead of the 7th floor, it is stepped to a point corresponding to the 7th floor by the relay ZB. Positive potential from wiper $BW_1$ is now applied via operated contact $Bc_3$ (in upper position) and terminal 8 through lead 8—10 to one side of relay AST in Figure 1 which relay operates to negative potential derived through terminal 7 and lead $g_1$—16 from contact $g_1$.

The lift continues to run in the direction of the required floor, though if necessary a slowing down action may be initiated by the operation of relay AST in any known manner such as by pole changing or by the application of a suitable form of brake such as one employing eddy currents. When almost at the required floor, a further inductor relay ZC (Figure 1) is operated by a levelling plate, and positive from its contact is supplied via terminal 19, lead 19, contact $Ast_2$ and terminals 18 and 17 on Figure 1A to short circuit relay AR and through lead 19, terminals 19, 18 and 17 (Figure 2A) for relay BR. The relays AR and BR release.

$Br_2$ (Figure 2) energizes the second coil of the operated storage relay BC in a reverse direction causing de-energization of the core and release of the relay.

$Ar_1$ (Figure 1) de-energizes the up drive contactor UD, causing the lift to cease to travel in consequence of the application of the brake to the driving shaft.

The passenger now opens the lift gate, causing one of the contacts GA—GL to open. Each of these contacts is operated by a lift gate, and opening of the contacts releases relay G. This relay, normally operated, opens all its contacts $g_1$—$g_3$, on release. Contact $g_1$ by removing the negative from lead $7g_1$ and lead 16 prevents operation of relays AR and BR until the gates are once more closed whilst contacts $g_2$ and $g_3$ prevent energization of the contactors UD and DD.

Further travel of the lift is initiated by depression of one of the buttons CA—CH in the car by the passenger, and takes place in a manner similar to that previously described in connection with Patent No. 2,094,047. It has been stated that a slight difference exists between the two apparatus groups Figures 1, 1A and 2, 2A. This difference resides in the devices provided for ensuring that the switches occupy positions which at all times coincide with the lift's motion or position. Considering Figures 1, 1A, when the lift reaches the lowest floor the limit switch LD (Figure 3) opens, removing through leads LD and 21 positive from terminals 21. This allows current to flow through one coil of relay AT to positive on wiper $AW_3$ if this wiper is standing on the connected contacts. These contacts occur on switch levels other than that corresponding to the first floor, so that if the switch is standing at a position other than this, the relay AT is operated and its contact $At_1$ moving to lower contact applies positive from wiper $AW_3$ via self interrupting contacts $wa$ or $wb$ to whichever of the magnets (in this case AWA) drives the switch in a "downward" direction. The switch continues to drive until it reaches a position corresponding to the lowest floor when the wiper leaves the connected contacts, releases relay AT and contact $At_1$ interrupts its self-interrupted stepping path. A similar circuit is provided in Figures 2, 2A whereby the switch BW is stepped in an upward direction when the lift reaches its top position and opens contact LU.

It is however possible that the switch shown in Figures 2, 2A may be out of position during travel of the lift from say floor 7 to floor 1, in which case it would not occupy the position shown in the drawings. In similar fashion, the switch in Figure 1 may not follow the lift's motion when the latter travels from floor 3 to floor 6. It is therefore required to position the switch BW in Figures 2, 2A at a point coinciding with floor 4 (not served by this BW switch) when the lift has travelled downwards, and the switch in Figures 1, 1A at a point coinciding with floor 5 when the lift has travelled to its uppermost position.

It will thus be seen that the connections to the banks AW3 are slightly different in each case, and these alterations can either be made on the switch bank during erection of the controlling mechanism or the bank contacts may be wired out to terminals in the manner shown for the remaining variable connections in the figure, in which case connections between the said terminals are employed to effect suitable synchronization.

As shown in the specification of Patent No. 2,094,047, each apparatus group is mounted on a separate plate provided with an interconnecting jack or terminal strip, so that not only are all the plates for one particular lift interchangeable (with the slight modifications to banks BW3 previously mentioned) but spare replacement groups may be used to substitute in place of any group which develops a fault, the latter being then available for adjustment or repair without interrupting the operation of the lift for more than the time necessary to exchange the plates.

Although the invention has been described in connection with a lift system serving only 8 floors and having only two apparatus groups, it is easy to provide any number of the latter to control a lift having a greater extent of travel. All that is necessary is to connect all the DR relays in parallel and all the R relays in parallel; and all the relay contact chains associated with the banks W1 in series, with other slight modifications where necessary. Thus if each group controls the lift over a maximum of "$n$" floors, and there are "$k$" groups, the lift can be made to serve a maximum of $kn$ floors.

I claim:—

1. In a control system for an electrically operated lift serving a plurality of groups of floors, a plurality of interchangeably similar apparatus groups comprising lift following means, a control relay, a direction relay and call storage relays and cancelling means for each group of floors, a drive motor for the lift, circuit connections arranged to be energized by the control and direction relays of one only of said apparatus groups for operating the motor to drive the lift, circuits arranged to be energized by operation of a call storage relay in one apparatus group for the simultaneous operation of the control and direction relays in all the apparatus groups and means carried by the lift and cooperating with the following means of an apparatus group for energizing the cancelling means associated with an operated call storage relay to cancel the call when the lift reaches the floor of the registered call.

2. A control system for an electrically operated lift as in claim 1 wherein each apparatus group is provided with a chain of contacts in series circuit, said contacts being arranged to be operated by the call storage relays of the associated apparatus group, interconnecting circuits for connecting the chain contacts of the several apparatus groups in series, and circuits for connecting the respective direction relays of all the apparatus groups in parallel circuit between the ends of the entire series of said chain contacts for the simultaneous operation of all of said direction relays when a call storage relay of any apparatus group is operated.

3. A control system for an electrically operated lift as in claim 1 wherein the call storage relays of each apparatus group are provided with contacts for operating the associated control relays, and circuit connections are provided for placing the control relays of all the apparatus groups in divided circuit through the closed contact of an operated call storage relay in one apparatus group for the simultaneous operation of the control relays in all the apparatus groups.

4. A control system for an electrically operated lift as in claim 1 wherein the control relays of the several apparatus groups when energized by operation of a call storage relay in any one of the apparatus groups are arranged to be simultaneously deenergized to stop the motor and the lift by an inductor relay on the lift operating through a divided circuit to the respective control relays in the several apparatus groups, deenergization of the control relays being effected only when the lift following means of an apparatus group has arrived in position to cancel a registered call in that apparatus group.

5. A control system for an electrically operated lift as in claim 1 wherein the control relays of the several apparatus groups when energized by operation of a call storage relay in any one of the apparatus groups are arranged to be simultaneously deenergized to stop the motor and the lift by a divided circuit to the respective control relays in the several apparatus groups, and a stop relay with a divided circuit adapted to be energized from the lift following means of any of the several apparatus groups is arranged to complete said deenergizing circuit when the lift arrives at the floor of a registered call in an apparatus group.

6. A control system for an electrically operated lift as in claim 1 wherein the lift following means of each apparatus group comprises a step-by-step wiper switch operated by up and down stepping magnets in the respective apparatus groups and individual inductor relays carried by the lift are arranged to be operated for operating the respective stepping magnets of an apparatus group only when the lift is traveling through he group of floors corresponding to the apparatus group.

7. A control system for an electrically operated lift as in claim 1 wherein each apparatus group is provided with a terminal relay cooperating with the associated lift following means of the group for keeping the lift following means of the respective apparatus groups in step with the lift, limit switches connected by divided circuits to the respective terminal relays of the apparatus groups and circuit means for operating the terminal relay of an apparatus group when the associated lift following means of the group is out of step and if out of step moving the following means into step.

8. A control system for an electrically operated lift as in claim 1 wherein each apparatus group is provided with call storage relays for a corresponding group of floors, the call storage relays being arranged to be operated by landing and car push buttons of the respective floors of corresponding floor groups, a car floor switch having a normally closed contact permitting only landing push buttons to operate the call storage relays when no one is in the lift and a contact adapted to be closed when the lift is occupied and so arranged that the call storage relays may be operated by the car push buttons, and circuit connections from the respective landing and car push buttons of each floor group to the corresponding contacts of the car floor switch, the arrangement being such that the storage relays of each apparatus group may be operated independently of another apparatus group through said floor switch contacts only by operation of the respective push buttons of the corresponding floor group.

9. A control system for an electrically operated lift as in claim 1 wherein the lift following means in each apparatus group comprises a wiper switch having up and down stepping magnets arranged to be selected by the associated direction relay, individual inductor relays for each apparatus group carried by the lift for operating the selected stepping magnets of the groups, and wiper controlled lamp circuits associated with the wiper switches of the respective apparatus groups for successively lighting lamps at the floors of corresponding apparatus groups.

NORMAN CAROL SMART.